United States Patent [19]
Young et al.

[11] Patent Number: 5,463,163
[45] Date of Patent: Oct. 31, 1995

[54] PROCESS FOR ABSORBING TOXIC WASTE FOR LONG TERM PERMANENT STORAGE

[75] Inventors: Trent P. Young; Trent P. Young, Jr., both of Longmont; Paul R. Ingram, Thornton; Steven J. Ingram, Denver, all of Colo.

[73] Assignee: SOL-CAP, Inc., Longmont, Colo.

[21] Appl. No.: 38,485

[22] Filed: Mar. 29, 1993

[51] Int. Cl.⁶ ................................................. B09B 3/00
[52] U.S. Cl. ........................... 588/249; 405/128; 588/1
[58] Field of Search ................... 588/249, 252, 588/255, 256, 257, 259, 1–3, 17; 405/128, 129; 252/628

[56] References Cited

U.S. PATENT DOCUMENTS

| | | | |
|---|---|---|---|
| 3,716,490 | 2/1973 | Van De Vourde | 252/628 |
| 3,782,299 | 1/1974 | Egger | 588/252 X |
| 4,056,112 | 11/1977 | Calmon | 252/628 X |
| 4,383,944 | 5/1983 | Ondracek | 252/628 |
| 5,249,888 | 10/1993 | Braithwaite et al. | 405/128 |

FOREIGN PATENT DOCUMENTS

| | | | |
|---|---|---|---|
| 3523179 | 1/1987 | Germany | 588/255 |
| 90325 | 8/1978 | Japan | 588/255 |

Primary Examiner—David H. Corbin
Attorney, Agent, or Firm—Edwin H. Crabtree; Donald W. Margolis

[57] ABSTRACT

A process for absorbing liquid and solid toxic waste in an agglomerate using asbestos, rock wool and the like as a sponge material. The toxic waste is mixed with the sponge material in a dehydration tank. The dehydration tank is used to remove any residual vapor from the mixed material in order to provide a dry textured mixture. The dry mixture of the sponge material with absorbed toxic waste is than introduced to a resin adhesive mixing tank. The resin adhesive mixing tank is used for coating the exterior surface of the sponge material to prevent seepage and migration of the toxic waste from the sponge material. The coated sponge material with toxic waste is removed from the resin adhesive mixing tank and individual portions of the coated mixture are compacted under high pressure into a stackable solid waste cubes. In the case of absorbing radioactive nuclear toxic waste, each of the solid waste cubes is than encapsulated with a lead and cadmium thermoplastic coating for attenuating gamma radiation from the toxic waste. The cadmium prevents emitted neutrons in the toxic waste from ionizing the lead in the surrounding encapsulation. Finally, the encapsulated solid waste cubes are ready to be safely handled and transported to a disposal site for permanent disposal.

16 Claims, 1 Drawing Sheet

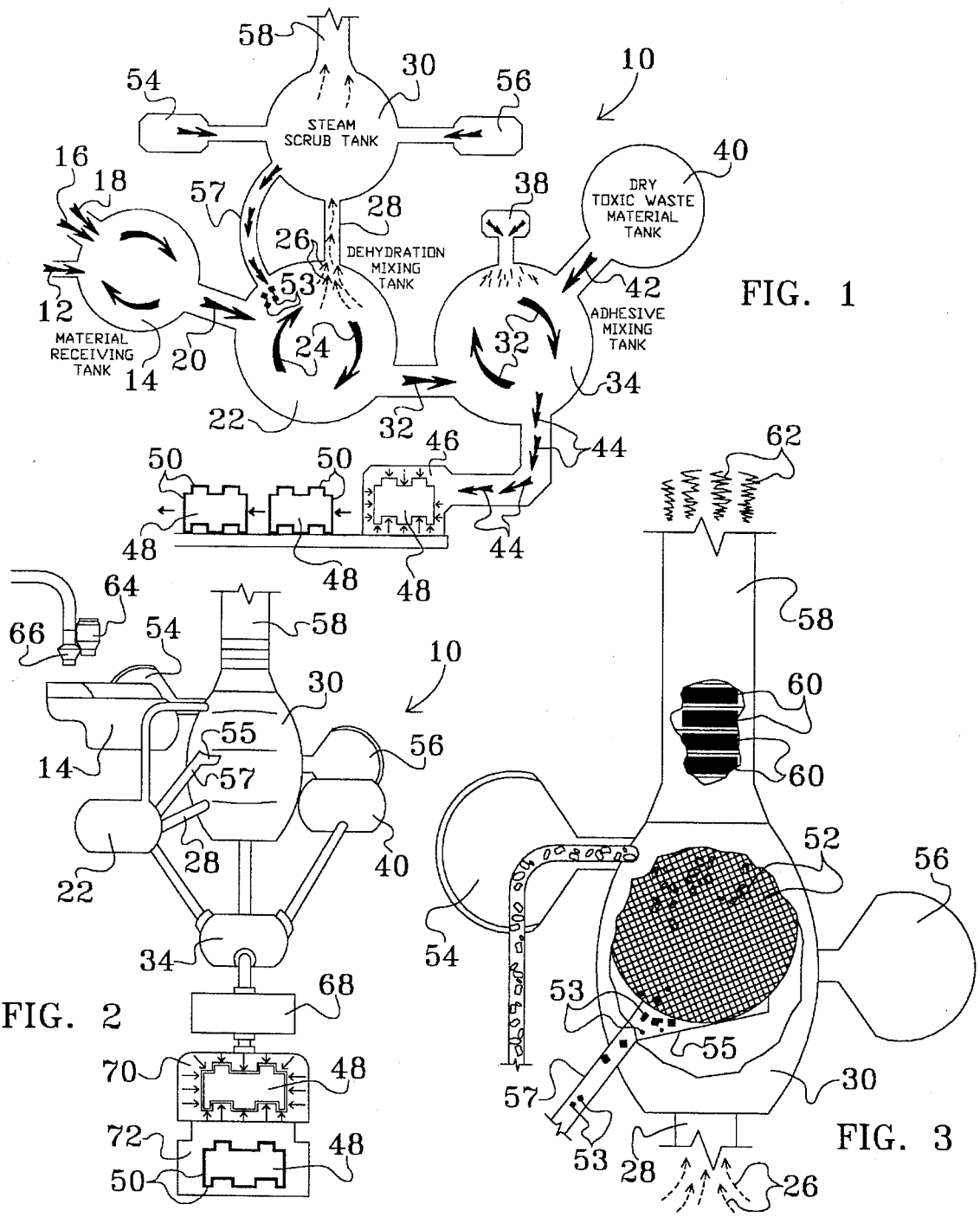

5,463,163

PROCESS FOR ABSORBING TOXIC WASTE FOR LONG TERM PERMANENT STORAGE

BACKGROUND OF THE INVENTION (a) Field of the Invention

This invention relates to safely handling and permanent storage of toxic waste, and more particularly, but not by way of limitation, to a process of using an absorbent material such as asbestos, rock wool and the like for absorbing toxic waste and compacting and encapsulating the mixture in solid stackable waste cubes.

(b) Description of the Prior Art

Heretofore there have been a variety of different processes, methods and apparatus for treating liquid and solid radioactive waste as described in U.S. Pat. No. 4,263,163 to Ross, U.S. Pat. No. 4,518,508 to Conner, U.S. Pat. No. 4,849,184 to Fougeron et al., U.S. Pat. No. 4,927,564 to Barlou et al. and U.S. Pat. No. 5,063,001 to Miyao et al.

Also, various types of processes and apparatus have disclosed as to the drying, coating, solidifying and encapsulating of heavy metals and radioactive waste as described in U.S. Pat. No. 4,246,233 to Sheeline , U.S. Pat. No. 4,280,922 to Puthawala et al., U.S. Pat. No. 4,629,587 to Monden et al., U.S. Pat. No. 4,781,944 and 4,821,653 to Jones and U.S. Pat. No. 4,834,914 to Jackson. None of the above mentioned patents disclose or teach the unique features of the subject process wherein minerals such as asbestos, rock wool and the like are used to combine with toxic waste as an agglomerate to be compacted into a stackable solid waste cube.

SUMMARY OF THE INVENTION

A primary object of the present invention is to provide a process that eliminates the storage of toxic waste in barrels which have a short term life of up to twenty years wherein the subject process allows for long term permanent storage of dangerous toxic wastes and other materials harmful to the environment.

Another object of the invention is to provide an encapsulated waste cube which is easy and safe to handle and is stackable. Also, the solid waste cubes can be safely transported without fear of contaminating the environment during a move to a disposal site. The solid waste cubes are formed into an interlocking design which eliminates the need for using skids or banding when stacking and storing the cubes.

Still another object of the invention is the process was developed to minimize health hazards to workers during the fabrication of the solid waste cubes and greatly reduce any chance of exposure to radiation from the material being handled. The agglomerate is coated with a resin adhesive to prevent seepage and migration of the toxic waste from the sponge absorbent material. The solid waste cubes are encapsulated to protect workers and the environment from radiation during the handling of the cubes and after disposal.

Yet another object of the invention is the absorbent qualities of asbestos, rock wool and like materials are used for absorbing toxic wastes. Further no chemical reactions are used during the process which could be explosive and dangerous to plant personnel and the surrounding country side. The process when completed in completely stable. Also, minerals such as asbestos and rock wool are light in weight, cost effective, plentiful, inorganic, non-flammable, resistant to corrosive chemicals and heat along with being an inert load bearing material ideal as a sponge material for holding toxic waste.

The present invention includes a process for absorbing liquid and solid toxic waste in an agglomerate using asbestos, rock wool and the like as a sponge material. The toxic waste is mixed with the sponge material in a dehydration tank. The dehydration tank is used to remove any residual liquid and vapor from the mixed material in order to provide a dry textured mixture. The dry mixture of the sponge material with absorbed toxic waste is than introduced to a resin adhesive mixing tank. The resin adhesive mixing tank is used for coating the exterior surface of the sponge material to prevent seepage and migration of the toxic waste from the sponge material. The coated sponge material with toxic waste is removed from the resin adhesive mixing tank and individual portions of the coated mixture are compacted under high pressure into a stackable solid waste cubes. For example, the coated mixture can be compressed in a range of 5000 to 50,000 psi or greater depending on the desired hardness required of the mixture. Each of the solid waste cubes is than encapsulated with a thermoplastic coating. When nuclear waste is mixed with the sponge material, a lead and cadmium thermoplastic coating is used for attenuating gamma radiation from the nuclear waste. The cadmium prevents emitted neutrons in the toxic waste from ionizing the lead in the surrounding encapsulation. Finally, the encapsulated solid waste cubes are ready to be safely handled and transported to a disposal site for permanent disposal. The residual liquids, removed from the dehydration tank as vapors, are introduced into a steam scrub chamber where they are cleaned and passed through activated charcoal filters prior to discharge to the atmosphere as contaminate-free vapor.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a perspective view of receiving and mixing tanks coupled together along with a high pressure compactor used in the subject process to form encapsulated stackable solid waste cubes.

FIG. 2 is a front view of the receiving and mixing tanks with toxic waste container and transfer hose.

FIG. 3 is an enlarged front view of a steam scrub chamber with a portion of the chamber cut-away to illustrate filters used in cleaning contaminated vapors from a dehydration mixing tank.

DESCRIPTION OF THE PREFERRED EMBODIMENT

In FIG. 1, a perspective view is shown of receiving and mixing tanks coupled together along with a high pressure compactor used in the subject process to form encapsulated stackable solid waste cubes. The overall equipment used in the process is designated by general reference numeral 10.

The process 10 includes the following steps wherein the first step is introducing an absorbent material, indicated by arrow 12, into a material receiving tank 14. The absorbent material may be asbestos, rock wool and like minerals used for their sponge-like qualities. For example, chrysotile asbestos and amosite asbestos demonstrate unique properties which are effective for absorption and encapsulation of toxic waste. Also, these materials have excellent load bearing properties, have resistance to a wide range pH and can be compressed into stackable solid waste cubes. Liquid toxic waste, indicated by arrow 16, and oil base and solvent toxic waste, indicated by arrow 18, are also received in the material receiving tank 14 and transferred, as shown by arrow 20, into a dehydration mixing tank 22.

As the materials are mixed, as shown by arrows 24, the absorbent material 12 acts as a sponge for collecting the toxic wastes 14 and 16 therein. Any residual liquid toxic waste not absorbed is vaporized and passed upwardly, shown as dashed arrows 26, through a gas discharge port 28 into a steam scrub chamber 30. A mixture, shown as arrows 32, of the absorbent material 12 with toxic wastes 16 and 18 is an agglomerate which is now moved into an adhesive mixing tank 34. The mixture 32 is sprayed and coated with a phenolic resin which coats the surface of the absorbent material 12 and prevents migration and seepage of the toxic waste from the agglomerate. The resin is shown as a spray 36 discharged from a bonding solution dispenser 38 connected to the adhesive mixing tank 34. A dry toxic waste material tank 40 is connected to the adhesive mixing tank 34 for adding additional dry toxic waste, indicated by arrow 42, to the mixture 32 to be absorbed therein and coated with the resin spray 36.

Individual portions of the coated mixture 32, shown as arrows 44, are channeled to a high pressure compactor 46 where the absorbent material 12 with toxic waste absorbed in the mixture 32 is formed into stackable solid waste cubes 48. Upon forming the stackable cubes 48, each of the cubes if containing a radioactive nuclear waste is encapsulated with a lead and cadmium thermoplastic coating 50. The lead in the coating 50 significantly attenuates gamma radiation from the toxic waste and provides corrosion protection. The cadmium in the coating 50 prevents emitted neutrons from the waste which will ionize lead. The thermoplastic provides greater tensile strength to the encapsulation and improves the lead's mechanical properties. The thermoplastic coating 50 comes from a polymer plastic extruding system 47 which is incorporated into the high pressure compactor 46.

The completed solid waste cubes 48 can now be easily handled using a forklift or similar equipment where the cubes 48 are stacked one on top of the other and safely transported to a disposal site where they are permanently stored with no danger to the surrounding environment and personnel working in and around the disposal area.

Referring now to the steam scrub chamber 30 shown in FIGS. 1–3, contaminated vapors, shown as dashed arrows 26, are passed upwardly through a monel fiber filter 52 or like type filter where the vapors 26 are mixed with steam introduced from a steam generator 54. A portion of the chamber 30 is cut away in FIG. 3 in order to illustrate the monel fiber filter 52 used for filtering the vapors 26. Any solid contaminates in the vapors 26 are screened in the filter 52 and washed therefrom using the steam from the steam generator 54. The washed solid contaminates are cooled using cold air from a frigid air compressor 56 which is connected to the scrub chamber 30. The solid contaminates, which are shown as particles 53, are drawn into a vacuum chamber 55 in the side of the steam scrub chamber 30 and then returned to the dehydration mixing tank 22 via a sediment return port 57.

An exit vapor stack 58 is mounted on top of the steam scrub chamber 30 for receiving the filtered vapors from the filter 52. The vapors are passed through a series of activated charcoal filters 60 before they leave the top of the stack 58 as contaminate-free vapors. The stack 58 in FIG. 3 has been cutaway to show the charcoal filters 60. The contaminate-free vapors are shown as lines 62 going into the atmosphere.

Referring now to FIG. 2, a toxic waste material container 64 and transfer hose 66 is shown disposed above the material receiving tank 14 for replenishing the toxic wastes 16 and 18 along with the absorbent material 12 received in the tank 14. Also, a similar transfer hose and container are used for adding dry toxic waste 42 to the dry toxic waste material tank 40. This hose and container are not shown in the drawings.

It is important to note that the above process 10 for absorbing toxic and nuclear waste is a completely closed and stable system. The materials may be enclosed in underground silos or enclosed weatherproof storage tanks protected from rupture to protect the surrounding environment from any likelihood .

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A process for absorbing toxic waste in an agglomerate using a sponge material, the sponge material of mineral origin having long flexible fibers interwoven, the steps comprising:

mixing the sponge material with the toxic waste;

coating the exterior surface of the sponge material prevent seepage and migration of the toxic waste from the sponge material; and compacting the coated sponge material with toxic waste for disposal.

2. The process as described in claim 1 further including the step of encapsulating the compacted coated sponge material with toxic waste prior to transportation to a disposal site.

3. The process as described in claim 2 wherein the compacted coated sponge material with toxic waste is encapsulated with a lead and cadmium thermoplastic coating for attenuating gamma radiation from nuclear waste, the cadmium preventing emitted neutrons in the nuclear waste from ionizing the lead in the surrounding encapsulation.

4. The process as described in claim 2 further including a step of transporting the encapsulated compacted coated sponge material with toxic waste to a disposal site for permanent disposal.

5. The process as described in claim 1 further including a step of removing residual liquids after mixing the sponge material with the toxic waste, vaporizing the liquids and introducing the vapors into a vapor cleaning chamber where the vapors are cleaned and passed to the atmosphere as contaminate-free vapor.

6. A process for absorbing liquid and solid toxic waste in a sponge material, the sponge material of mineral origin having long flexible fibers interwoven, the steps comprising:

mixing the sponge material with toxic waste in a dehydration tank and removing any residual liquid and vapor from the mixture in order to provide a dry textured mixture;

introducing the dry mixture of the sponge material with absorbed toxic waste in a coating tank;

coating the exterior surface of the sponge material to prevent seepage and migration of the toxic waste from the sponge material;

removing the coated sponge material with toxic waste from the coating tank; and compacting the coated sponge material with toxic waste for transporting to a disposal site.

7. The process as described in claim 6 further including the step of encapsulating the compacted coated sponge material with nuclear waste with a lead and cadmium thermoplastic coating for attenuating gamma radiation from the nuclear waste, the cadmium preventing emitted neutrons in the nuclear waste from ionizing the lead in the surrounding encapsulation.

8. The process as described in claim 6 further including a step of removing residual liquids from the mixing tank as vapors and introducing the vapors into a steam scrub chamber where the vapors are cleaned and passed through activated charcoal filters prior to discharging the vapors to the atmosphere as contaminate-free vapor.

9. The process as described in claim 8 further including the step of removing contaminated particles from the vapors in the steam scrub chamber and returning the contaminated particles to the mixing tank.

10. The process as described in claim 9 further including the step of washing the contaminated particles with steam and cooling the contaminated particles prior to returning the particles to the mixing tank.

11. A process for absorbing liquid and solid toxic waste in an agglomerate using asbestos, rock wool and the like as a sponge material, the sponge material of mineral origin having long flexible fibers interwoven, the steps comprising:

mixing the sponge material with toxic waste in a dehydration tank;

removing any residual liquid and vapor from the mixture in order to provide a dry textured mixture;

introducing the dry mixture of the sponge material with absorbed toxic waste in a resin adhesive mixing tank;

coating the exterior surface of the sponge material to prevent seepage and migration of the toxic waste from the sponge material;

removing the coated sponge material with toxic waste from the resin adhesive mixing tank;

compacting under high pressure the coated sponge material with toxic waste into a stackable solid waste cubes; and encapsulating the stackable solid waste cubes with a thermoplastic coating.

12. The process as described in claim 11 further including a step of transporting the encapsulated solid waste cube to a disposal site for permanent disposal.

13. The process as described in claim 11 further including the step of encapsulating the compacted coated sponge material with nuclear waste with a lead and cadmium thermoplastic coating for attenuating gamma radiation from the nuclear waste, the cadmium preventing emitted neutrons ion the nuclear waste from ionizing the lead in the surrounding encapsulation.

14. The process as described in claim 11 further including a step of removing residual liquids from the dehydration tank as vapors and introducing the vapors into a steam scrub chamber where the vapors are cleaned and passed through activated charcoal filters prior to discharging the vapors to the atmosphere as contaminate-free vapor.

15. The process as described in claim 14 further including the step of removing contaminated particles from the vapors in the steam scrub chamber and returning the contaminated particles to the mixing tank.

16. The process as described in claim 15 further including the step of washing the contaminated particles with steam and cooling the contaminated particles prior to returning the particles to the mixing tank.

* * * * *